TRANSISTOR TRIGGER CIRCUIT

Filed Dec. 4, 1957

INVENTOR
GENUNG L. CLAPPER
BY G. R. Gugger
AGENT

United States Patent Office 2,864,007

Patented Dec. 9, 1958

2,864,007

TRANSISTOR TRIGGER CIRCUIT

Genung L. Clapper, Vestal, N. Y., assignor to International Business Machines Corporation, New York, N. Y., a corporation of New York Application December 4, 1957, Serial No. 700,668

7 Claims. (Cl. 307—88.5)

This invention relates generally to trigger circuits and more particularly to a semiconductor trigger provided with an integrating feedback feature.

The present invention finds particular usefulness in connection with the overcoming of high harmonics which generally result when opening or closing a circuit due to contact bounce. Much of the noise resulting from contact bounce may be removed by filtering but to be effective it must cause a very slow rise in voltage at the filter output thus creating a time delay.

In the ordinary course of events, contact bounce will distort a square wave output despite the fact that filters may be used. The present improved system overcomes such distortion by providing a transistor trigger arrangement which is flipped to one position by a positive voltage and to its other position by a negative voltage. In the present circuit, when the contact is closed, a first transistor is cut off and a second transistor is turned on. The resultant negative pulse is directed to complementary inverters which provide a positive output and this positive output is fed back to the input of the first transistor so as to drive it sufficiently positive that the contact bounce cannot affect the stable condition of the trigger. It is not until the contact is open that the trigger reverts back to its original position and the output voltage again swings negative. The present circuit combines the feedback with an input filter to produce a hysteresis action which in effect integrates the area of distortion thus overcoming the harmonics caused by the contact bounce.

Accordingly, it is an object of the present invention to provide a semiconductor trigger having means for utilizing the output to integrate the input to the trigger.

A further object of the present invention is to provide a semiconductor trigger including means for combining feedback with an input filter in such a way that hysteresis action results.

A still further object of the present invention is the provision of a novel transistorized circuit for producing a good square wave from the opening and closing of a contact switch.

Other objects of the invention will be pointed out in the following description and claims and illustrated in the accompanying drawings, which disclose, by way of examples, the principle of the invention and the best mode, which has been contemplated, of applying that principle.

In semi-conductive materials such as germanium or silicon, the electrical currents, according to presently accepted theory, are carried by electrons designated as "excess" electrons or by "holes" which are defect or missing electrons. According to the theory, a "hole"

may be viewed as a carrier of a positive electric charge and an electron as a carrier of a negative electric charge. Electron or "hole" carriers are designated generically by the term "mobile charges."

A semi-conductive material is called excess of N type when the mobile charges normally present in excess in the material under equilibrium conditions are electrons. N type semi-conductive material passes current easily when the semi-conductive material is negative with respect to a conductive connection thereto.

A semi-conductive material is called defect or P type when the mobile charges normally present in excess in the material under equilibrium conditions are holes. P type semi-conductive material passes current easily when the semi-conductive material is positive with respect to a conductive connection thereto.

Two principal classes of semi-conductor devices have been developed which have been referred to in the art as the "point contact transistor" and the "junction transistor." The present invention employs, purely as a matter of choice, the junction transistor which, as the name implies, includes a semi-conductive body having alternate zones of N and P type material forming between them junctions or barriers. Electrodes are placed in low-resistance contact with the discrete zones of the material and have been given the names of "collector" electrode, "base" electrode and "emitter" electrode. The collector electrode and the emitter electrode are in contact with the end zones of the semi-conductive body, and the base electrode is in contact with the intervening zone of the semi-conductive body.

The alternate zones of the body of the junction transistor may be in the series N–P–N or in the series P–N–P. In a base-input, grounded emitter circuit, a positive input pulse applied to the base electrode of a P–N–P junction transistor will cause the current flowing from the collector to decrease; whereas, a positive input pulse applied to the base electrode of an N–P–N junction transistor will cause the current flowing into the collector to increase. Thus P–N–P and N–P–N transistors have complementary operating characteristics.

Figure 1:
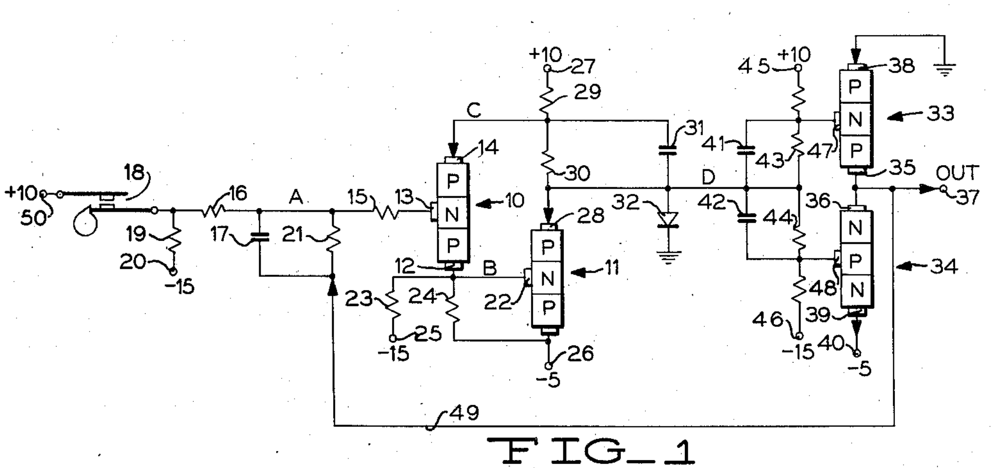
Fig. 1 is a schematic circuit diagram of a juncion transistor trigger circuit having a feedback circuit combined with an input filter in accordance with the present invention.

In accordance with the preferred embodiment of the present invention, a semi-conductor trigger is connected between an input filter and a semi-conductor complementary inverter driver output. Referring to Fig. 1, the trigger includes two junction transistors 10 and 11 which are of the P–N–P type. Transistor 10 has a collector electrode 12 in contact with one P type zone, a base electrode 12 in contact with the N type zone and an emitter electrode 14 in contact with the other P type zone. The base electrode 13 functions as the control electrode and is connected through a resistor 15, which functions to limit the base current in transistor 10, to an input filter comprising a resistor 16 and capacitor 17. The resistor 16, capacitor 17 combination filters the high frequency noise which results upon the closure of cam contacts 18. A resistor 19 connected between a negative 15 volt terminal 20 and the input filter serves to bias the trigger in an "off" state when the cam contacts are open. A resistor 21 is provided to by-pass capacitor 17 and to provide a D. C. voltage feedback to the base electrode 13, as will be later explained.

The collector electrode 12, which functions as the output electrode, is connected to the base or control electrode 22 of transistor 11. A pair of resistors 23 and 24, connected between these electrodes and the negative 15 volt terminal 25 and negative 5 volt terminal 26 respectively, combine to establish a voltage at B which is slightly lower than negative 5 volts to allow base current to flow in transistor 11.

A source of operating voltage, such as positive 10 volt terminal 27, is connected to the emitter electrode 14 of transistor 10 and the emitter electrode 28 of transistor 11 through resistors 29 and 30. The resistors 29 and 30 form a divider which sets the voltage at point C to give a D. C. voltage feedback which will effectively lock the trigger, as will be seen. A capacitor 31 is used to by-pass resistor 30 to provide a faster transient pulse to point C and the emitter electrode 14. Also, a diode 32 is shown connected to ground to limit the potential at point D.

The complementary inverter driver comprises a P–N–P type transistor 33 and an N–P–N type transistor 34 having their respective collector electrodes 35, 36 connected to an output terminal 37. The emitter electrode 38 of transistor 33 is shown connected to ground and the emitter electrode 39 of transistor 34 is connected to a negative 5 volt terminal 40. Capacitors 41, 42 and resistors 43, 44, connected between a positive 10 volt terminal 45 and a negative 15 volt terminal 46, form a dual divider which sets the voltages at the base electrodes 47, 48. In the static or no signal condition, point D is at ground potential and the base N zone of transistor 33 is at the same potential as its emitter zone and no current flows through the transistor. However, the base P zone of transistor 34 is positive with respect to its emitter zone causing current to flow in transistor 34 and placing the output potential at a negative 5 volts as shown on Fig. 2. A feedback wire 49 is shown connecting the output with the resistor 21 and filter capacitor 17.

Figure 2:
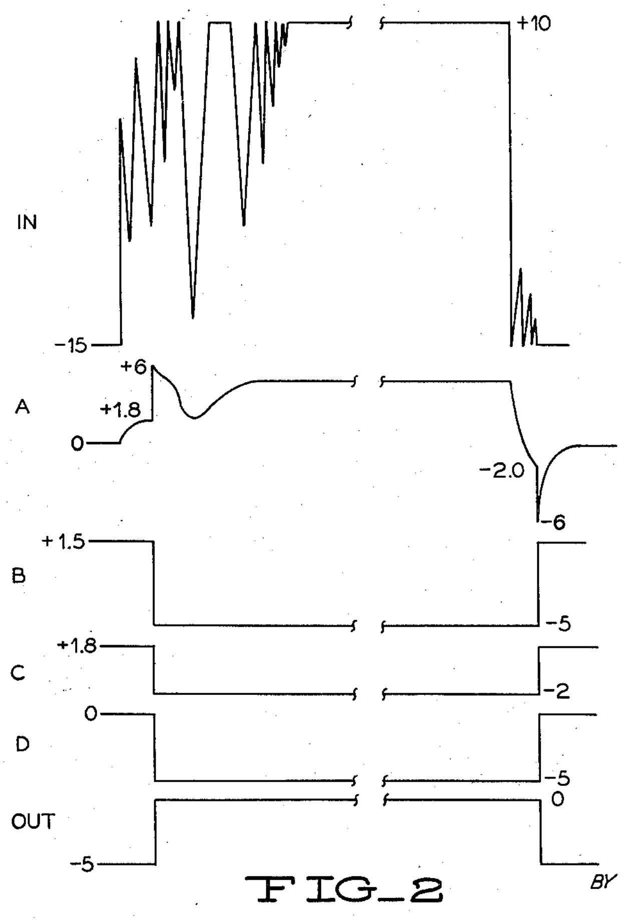
Fig. 2 is a diagram of the waveforms illustrating the operating characteristics of the circuit of Fig. 1.

Referring to the waveforms shown in Fig. 2, the circuit operates in the following manner: Upon the closure of cam contacts 18, the positive 10 volt source at terminal 50 causes the voltage at A to rise. When the voltage at A reaches approximately a positive 1.8 volts, the base zone N of transistor 10 will be driven sufficiently positive to begin cutting off the transistor. As a result, the voltage at B will drop to a negative 5 volts which drives the base zone N of transistor 11 sufficiently negative to turn this transistor "on."

With transistor 11 conducting, the voltage at C will drop to about negative 2 volts driving the emitter P zone of transistor 10 negative and thereby increasing the cutoff bias to lock transistor 10 in the "off" condition. It can be seen that a short feedback loop through resistor 30 and capacitor 31 has been provided which results in a hysteresis action which, in effect, retards or compensates for the changing voltage which occurs at the base zone N of transistor 10 due to the bouncing of contacts 18. Although the rise in voltage at A is relatively slow, capacitor 31 provides a fast transient voltage to flip the trigger quickly and the D. C. feedback through resistor 30 locks the trigger since point C is maintained at negative 2 volts. In order to reverse the state of the trigger, point A must drop to about negative 2 volts which assures that the trigger will stay on even though the contacts 18 may bounce for some time.

The conduction in transistor 11 also causes point D to drop to about negative 5 volts and this drop is applied to the base electrodes 47, 48 of the complementary inverter transistors 33 and 34 through the dual divider network. The negative 5 volts applied to the electrode 48 places the base zone P of transistor 34 at the same potential as its emitter zone N and transistor 34 stops conducting. Conversely, the negative 5 volts applied to electrode 47 drives the base zone N of transistor 33 negative with respect to its emitter zone P and current flows in transistor 33 causing a sharp rise in voltage at the output terminal 37 from negative 5 volts to about 0 volt.

The transient portion of the output voltage rise is fed back via wire 49 to the input filter capacitor 17 causing point A to be driven up sharply to about positive 6 volts. The D. C. portion of the voltage rise is fed back through the resistor 21 and the voltage at point A will stabilize at positive 5 volts when contacts 18 are fully made.

As was previously mentioned, in order to reverse the state of the trigger, the point A must drop to about negative 2 volts. When contacts 18 are opened, the voltage at A drops exponentially and when it reaches about negative 2 volts electrodes 13 and 14 of transistor 10 will be at the same potential and transistor 10 will begin to conduct. The voltages at points B and C will rise and the trigger reverts back to the original "off" state. The voltage at point D will also rise causing the output voltage to drop back to negative 5 volts and this voltage drop is fed back through the capacitor 17 and resistor 21 to overcome any bounce of contacts 18. The feedback through the input filter to the trigger, in effect, integrates the input voltage throughout the area of distortion caused by the bouncing of contacts 18 and this, coupled with the hysteresis action at point C, makes a very positive and stable operating trigger.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a trigger circuit the combination comprising, a first transistor, input filtering means for said transistor, input signal means connected to said filtering means for controlling the conductivity of said transistor, a second transistor controlled by said first transistor to assume a state of conductivity opposite to that of said first transistor, inverter driver means connected to the output of said second transistor, and means for feeding the output from said inverter driver means back to said input filtering means to integrate said input signal.

2. In a trigger circuit the combination comprising, a first transistor, input filtering means for said transistor, input signal means connected to said filtering means for controlling the conductivity of said transistor, a second transistor controlled by said first transistor to assume a state of conductivity opposite to that of said first transistor, circuit means connecting the output of said second transistor to said first transistor for controlling the cut-off bias of said first transistor, inverter driver means connected to the output of said second transistor, and means for feeding the output from said inverter driver means back to said input filtering means to integrate said input signal.

3. In a trigger circuit the combination comprising, a first transistor including a first emitter, a first base, and a first collector electrode, a second transistor including a second emitter, a second base, and a second collector electrode, input filtering means connected to said first base electrode, input signal means connected to said filtering means for controlling the conductivity of said first transistor, means connecting said first collector electrode with said second base electrode to enable said second transistor to assume a state of conductivity opposite to that of said first transistor, complementary inverter driver means connected to said second emitter electrode, and means for feeding the output from said complementary inverter driver means back to said input filtering means to integrate said input signal.

4. A trigger circuit as in claim 3 characterized by means connecting said second emitter electrode with said first emitter electrode enabling said second transistor to control the cut-off bias of said first transistor.

5. A trigger circuit as in claim 3 wherein said complementary inverter driver means comprises a pair of transistors of opposite conductivity types, each having a base electrode connected in circuit to said emitter electrode of said second transistor and a collector electrode connected in circuit to said input filtering means.

6. In a trigger circuit the combination comprising, a first transistor, a second transistor controlled by said first transistor to assume a state of conductivity opposite to that of said first transistor, means operable to render said first transistor nonconducting, feedback circuit means connected between said transistors and effective during conduction of said second transistor for increasing the cut-off bias of said first transistor, means for inverting the output of said second transistor, and means for feeding said inverted output back to said first transistor to augment said increase in cut-off bias caused by said feedback circuit.

7. In a trigger circuit the combination comprising, a first transistor including a first emitter, a first base, and a first collector electrode, a second transistor including a second emitter, a second base, and a second collector electrode, input signal means connected to said first base electrode and operable to render said first transistor nonconducting, means connecting said first collector electrode with said second base electrode to enable said second transistor to assume a state of conductivity opposite to that of said first transistor, a feedback circuit comprising a resistor and capacitor in parallel connected between said second emitter and said first emitter and effective during conduction of said second transistor for increasing the cut-off bias of said first transistor, complementary inverter driver means connected to said second emitter electrode, and means for feeding the output from said driver means back to said first base electrode to augment the biasing action caused by said feedback circuit.

No references cited.